United States Patent [19]

Leiblich

[11] Patent Number: 4,562,780
[45] Date of Patent: Jan. 7, 1986

[54] TRASH FARMING MEANS AND METHOD

[76] Inventor: Gordon F. Leiblich, P.O.Box 157, Kimba, South Australia, Australia

[21] Appl. No.: 491,743

[22] Filed: May 5, 1983

[30] Foreign Application Priority Data

May 5, 1982 [AU] Australia .................. PF3860

[51] Int. Cl.⁴ .......... A01C 7/20; A01B 21/08
[52] U.S. Cl. .............. 111/88; 172/526; 172/573; 172/574; 172/186; 172/169
[58] Field of Search .......... 172/169, 522, 526, 574, 172/510, 572, 573, 184, 186, 16; 111/87, 88

[56] References Cited

U.S. PATENT DOCUMENTS

| T862,011 | 5/1969 | Koronka | 111/88 |
|---|---|---|---|
| 925,541 | 6/1909 | Welch | 172/510 |
| 1,105,570 | 7/1914 | Lea | 111/87 |
| 1,261,397 | 4/1918 | Jackson | 172/573 X |
| 1,298,046 | 3/1919 | Huff | 172/522 |
| 1,581,841 | 4/1926 | Dillon | 172/169 X |
| 2,634,667 | 4/1953 | Woolwine | 172/186 X |
| 3,129,773 | 4/1964 | Freeman | 172/522 |
| 3,830,047 | 8/1974 | Asumendi | 172/526 |
| 4,294,181 | 10/1981 | Smith | 172/169 |
| 4,506,610 | 3/1985 | Neal | 111/87 |

FOREIGN PATENT DOCUMENTS

| 124777 | 7/1947 | Australia | 111/87 |
|---|---|---|---|
| 152688 | 12/1952 | Australia | 172/552 |
| 287436 | 1/1971 | U.S.S.R. | 111/87 |
| 363446 | 3/1973 | U.S.S.R. | 111/87 |
| 622428 | 9/1978 | U.S.S.R. | 172/522 |

Primary Examiner—Richard J. Johnson
Attorney, Agent, or Firm—Henry Sternberg; Bert J. Lewen

[57] ABSTRACT

A trash farming implement is provided with a plurality of tillage assemblies on an implement, each tillage assembly having a tillage disc arranged to rotate about an axis which is inclined slightly from the vertical both in end elevation and in side elevation so that it slopes upwardly and forwardly in the direction of travel, and also a soil replacing disc which has an axis of rotation which is nearly horizontal but slopes upwardly towards the tillage disc to which it is adjacent, the disc being so located that a furrow cut by the tillage disc will be filled by replacement of the lifted soil to its original position.

19 Claims, 8 Drawing Figures

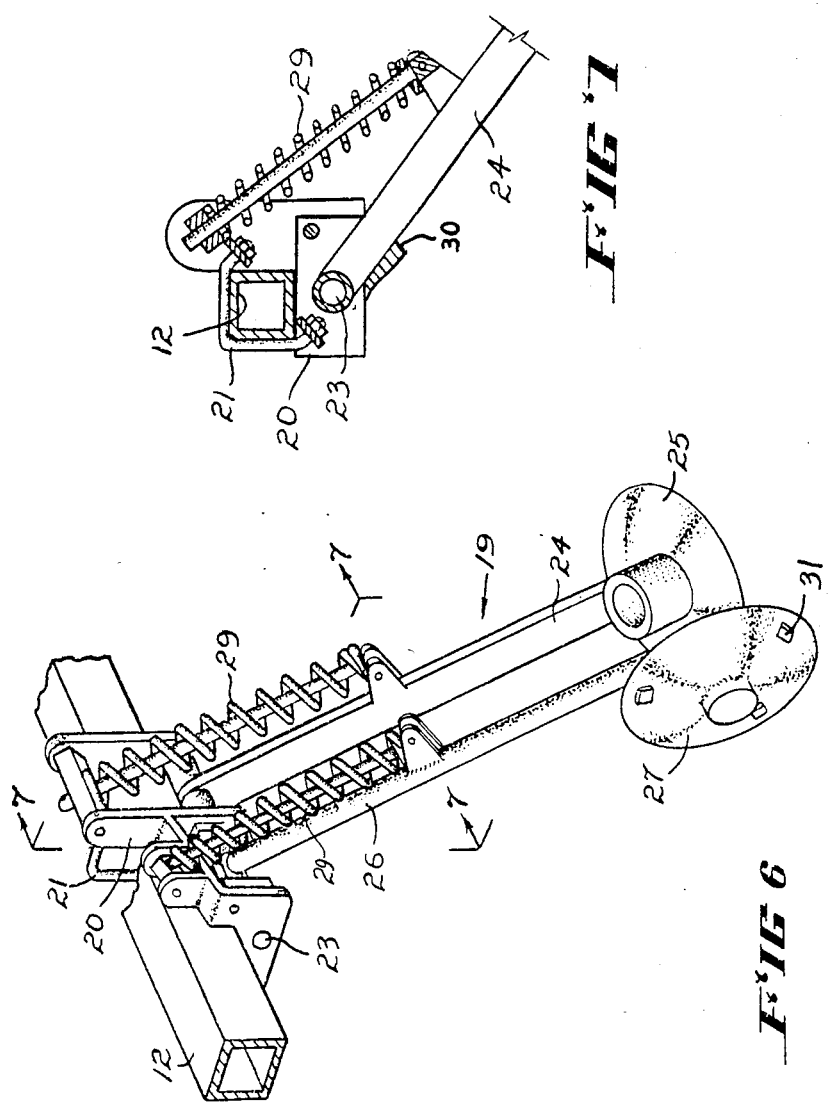

TRASH FARMING MEANS AND METHOD

This invention relates to a means and method for trash farming.

BACKGROUND OF THE INVENTION

Trash farming is in common use, because of the advantage of providing humus to the soil from above the surface of the soil, at which place the humus forms without denuding the soil of nitrogen. However considerable difficulty is encountered when attempts are made to plant seeds when trash farming techniques are employed, mainly due to the tendency of equipment to bunch the trash, and this is most inconvenient and undesirable. Furthermore, if use is made of the rotary disc type of implement (which is the most commonly used) the trash is frequently partially buried by the soil thrown up by the disc. Furthermore, particularly when air seeding techniques are employed, the seeds are planted unevenly, falling at any location down the sloping side walls of a furrow, and the germination is then uneven and in some cases quite unsatisfactory. Thus, for example, in the U.S. Pat. No. 1,105,570 of LEA, the seeds broadcast beneath a sloping disc will be at varying depths, and consistency of growth is difficult to achieve.

Partly because of the ability of a disc type implement to slice through the soil, these implements are the most widely used in farm tillage operations. However the normal method of tilling a paddock is to drive from the outer perimeter inwardly towards the centre of the paddock, it being difficult to drive in the other direction, as a consequence of this continual cultivation of a paddock with disc type implements frequently results in a transfer of top soil which under extreme cases will result in portion of a paddock having only the clay subsoil available for growing a crop, and this is obviously undesirable. It may be noted that the aforesaid LEA specification has no provision for soil replacement.

When trash farming has been practised previously, quite often the stalks of trash project into the air from the ground and do not fall on the ground until the area adjacent the ground has rotted through bacteria action. The rotting is partly due to the higher humidity at the surface of the ground because of ground moisture and partly due to the existence of micro-organisms in the ground. It is desirable therefore that in trash farming the trash should be chopped as much as possible, and should lie flat on the ground.

The main object of this invention is to provide means which will reduce or overcome the problems mentioned hereinabove.

BRIEF SUMMARY OF THE INVENTION

In an embodiment of this invention a trash farming implement is provided with a plurality of tillage assemblies on an implement, each tillage assembly having a tillage disc arranged to rotate about an axis which is inclined slightly from the vertical both in end elevation and in side elevation so that it slopes upwardly and forwardly in the direction of travel, and also a soil replacing disc which has an axis of rotation which is nearly horizontal but slopes upwardly towards the tillage disc to which it is adjacent, the disc being so located that a furrow cut by the tillage disc will be filled by replacement of the lifted soil to its original position.

Thus it will be seen that with this invention, much of the trash which might otherwise be buried in the soil is lifted by the tillage disc, the soil is loosened, and the trash therefore tends to lie on the surface and in contact with the surface of the soil. Some trash is chopped by both of the discs.

Whereas with normal farming techniques each ploughing results in a transfer of soil towards the periphery of a paddock, in this invention the soil can be replaced into its original location.

Specifically, this invention consists of a plurality of tillage assemblies each comprising a tillage frame, at least one tillage disc on each said tillage frame, bearings operatively disposed between each tillage disc and its tillage frame supporting that disc for rotation about an axis which is inclined to the vertical in end elevation, and which is also inclined to the vertical in side elevation so as to slope upwardly and forwardly in the direction of travel, and soil replacement means also on that said tillage frame, and so located and oriented that soil displaced by the tillage disc in one transverse direction is redirected by the soil replacement means in the opposite direction.

In an embodiment of this invention the soil replacement means comprises a soil replacing disc on a respective said tillage frame, further bearings operatively disposed between the said replacing disc and its tillage frame supporting that disc for rotation about an axis which is inclined to the horizontal in end elevation to slope transversely upwardly in a direction towards said tillage disc on that frame, and which is inclined to the direction of implement travel in plan to define an obtuse angle therewith, the lowermost points on the peripheries of the discs on each said tillage frame being adjacent each other.

BRIEF DESCRIPTION OF THE DRAWINGS

An embodiment of the invention is described hereunder in some detail with reference to and as illustrated in the accompanying drawings in which FIG. 6 is a fragmentary perspective view showing a tillage assembly, FIG. 7 is a cross-section taken on a plane 7—7—7 of FIG. 6.

Figure 1:
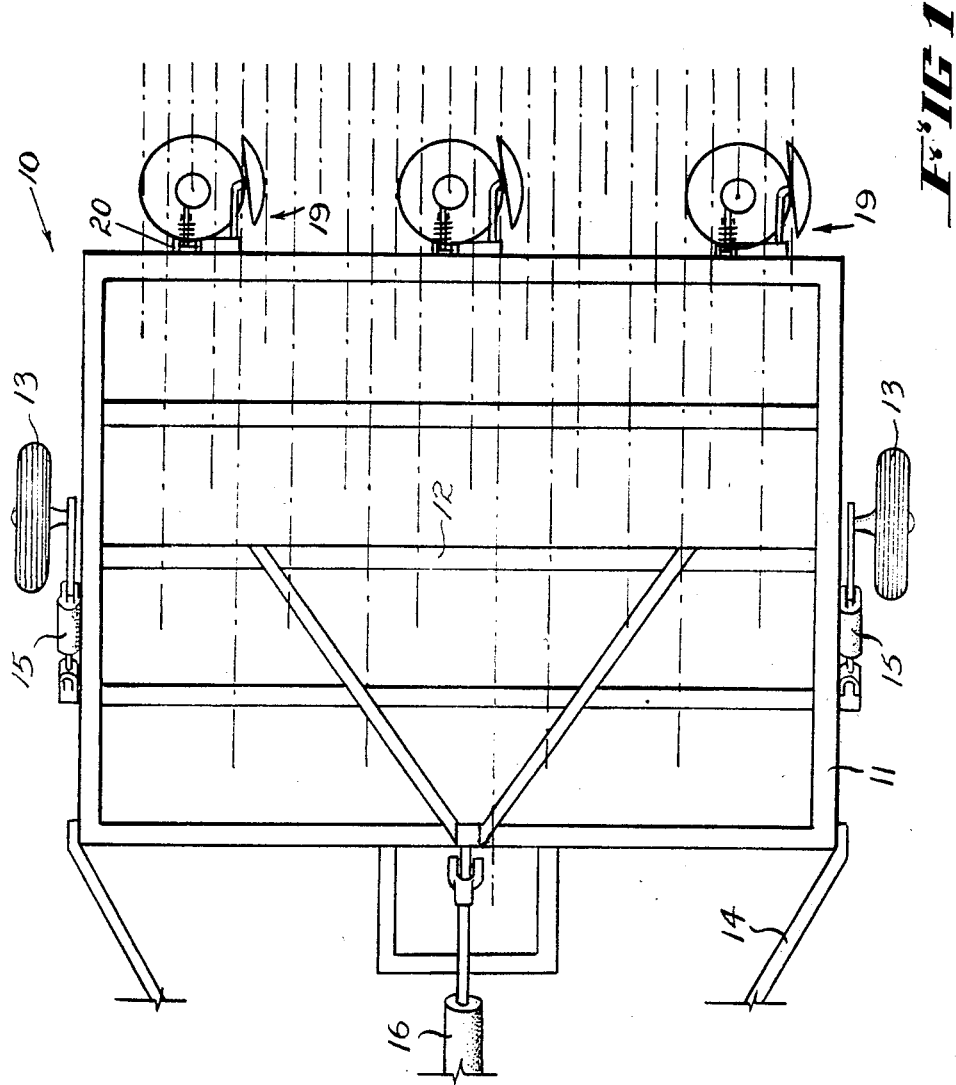
FIG. 1 is a plan view of a farming implement having thereon a plurality of tillage assemblies.
Figure 2:
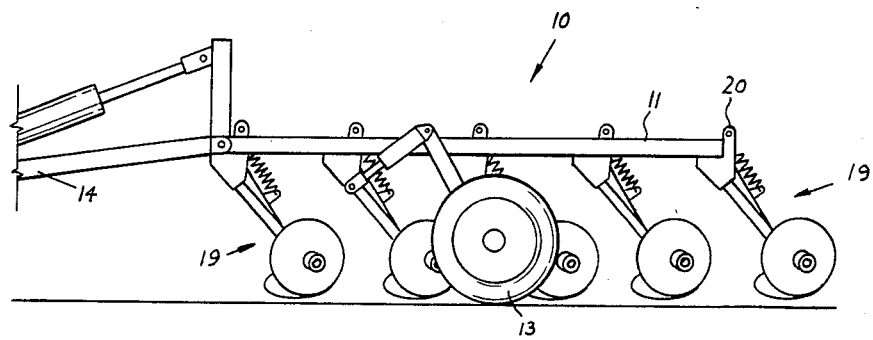
FIG. 2 is a side elevation of same.

Referring first to FIGS. 1 and 2, a farming implement 10 comprises an implement frame 11 of general rectangular form having on it a plurality of cross members 12 spaced from one another, and supported by wheels 13 and a draft frame 14, the wheels and draft frame being controlled for height by respective hydraulic cylinders 15 and 16, as is common in prior art for such machines.

The implement frame 11 carries on it a plurality of identical tillage assemblies each designated 19 arranged in at least four rows (five rows being illustrated), and each assembly comprises a clamp bracket 20 clamped to respective cross members 12 by clamping bolts 21. It is to be noted that one assembly is secured to the front of the frame. The assemblies are so spaced transversely that the rows of cultivation are equally spaced. Each clamp bracket 20 is provided with hinge pin 23 extending transversely to which in hinged a trailing tillage disc arm 24, the lower end of which carries a tillage disc 25, and to which is also hinged a trailing soil replacing disc arm 26 on the lower end of which is a soil replacing disc 27. At least the tillage disc 24 is provided with a stump jump spring 29 which functions in a known manner to allow the tillage disc 25 to ride up over obstructions, but the arm 24 is generally held against an abutment 30 by the spring 29. If an obstruction is encountered by the tillage disc 25, the disc moves both rearwardly and upwardly and because of its inclination (described below) it will tend to clear that obstruction with little danger of damage.

Figure 8:
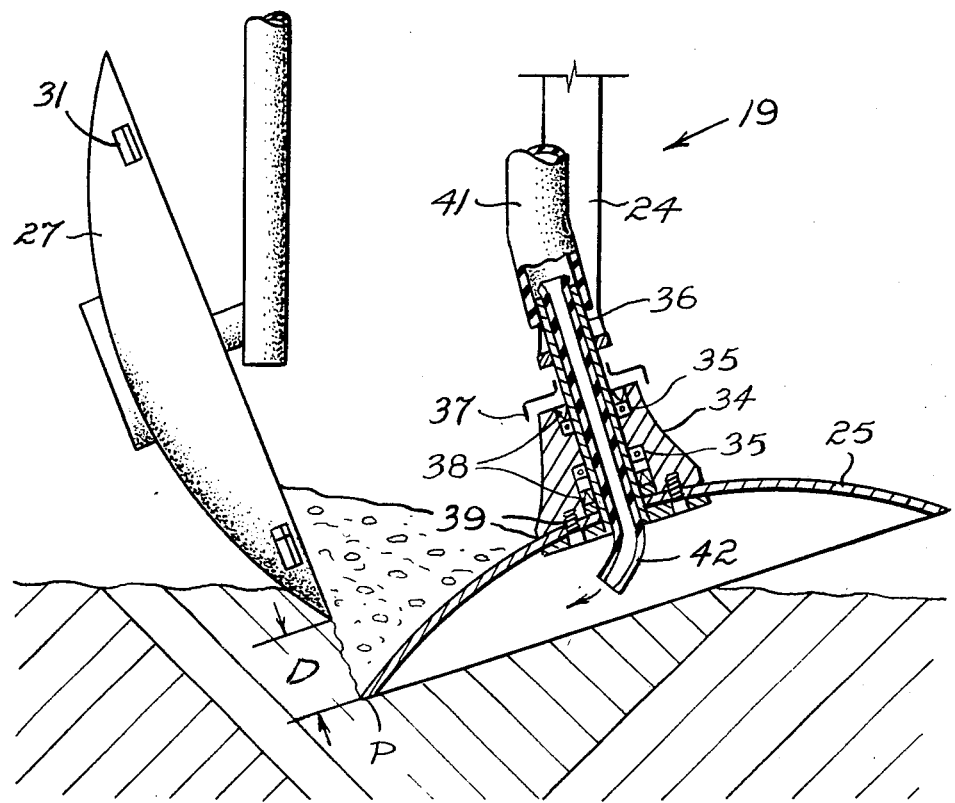
FIG. 8 is a view illustrating the method of seeding, using this invention.

Both the discs 25 and 27 have a hollow shape with both concave and convex surfaces, and to assist rotation of the soil replacing disc 27 its convex surface has thereon a plurality of projecting lugs 31 (FIG. 8). (In some embodiments disc 27 is flat).

Figures 4, 5:
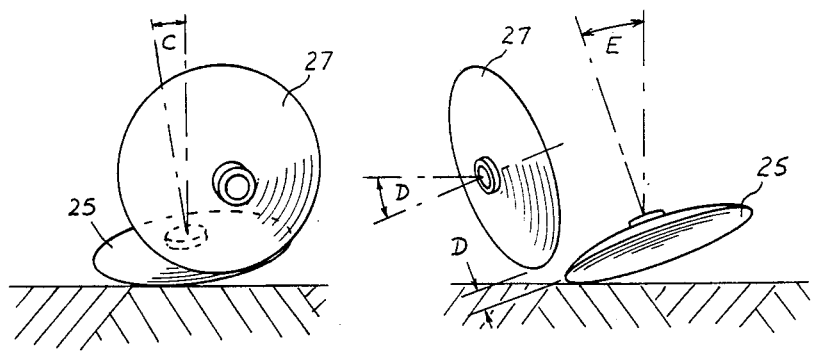
FIG. 4 is a side elevation of same.
FIG. 5 is a rear elevation of same.

Each disc is carried by bearings and as shown in FIG. 8, the tillage disc 25 has an upwardly extending outer bearing housing 34 which contains a pair of bearings 35 (which may be sleeve, ball or roller bearings) and these bearings 35 engage a tube 36 for rotation of the disc. There is an outer shroud 37 which extends over the bearing housing 34, which contains seals 38 to inhibit ingress of dust toward the upper surfaces, and the housing 34 also contains a felt seal 39 at its lower end which functions for the same purpose. The lowermost point of disc 27 is above the lowermost point of disc 25 by a distance "D" as shown in FIGS. 5 and 8.

Figure 3:
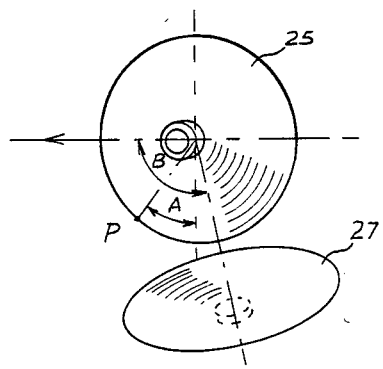
FIG. 3 is a plan view showing a tillage disc and soil replacement disc of one of the assemblies.

If reference is now made to the plan view of FIG. 3, the first point of contact P of the tillage disc 25 with the ground as it is lowered to encounter the ground is at an angle A of between 25° and 45° in order that the furrow formed by the tillage disc 25 will be correctly located with respect to the soil replacing disc 27. As the implement is moved over the soil, there will be sufficient turning moment imparted to the disc 25 to cause rotation so that the soil will be transported transversely towards the soil replacing disc 27, but since this rotates about an axis which defines an obtuse angle B of between 91° and 135° (and consequential location of disc 27 rearwardly of disc 25), this soil will be redirected in an opposite transverse direction to fill the furrow otherwise created, and avoid transverse movement of the top soil. The tillage disc 25 rotates about an axis which is inclined to the vertical so as to slope upwardly and forwardly by an angle C which is between 5° and 25°, thus ensuring that the point P is located forwardly of the transverse axis of tillage disc 25, while the angle E (FIG. 5) ensures the point P is forward in the direction of travel of axis of rotation of disc 25 so that the soil is directed towards the replacing disc 27. The disc 25 will be found to lift the soil (as shown in FIG. 8) and by inclining the disc 27 at an angle D of between 12° and 32° this lifted soil will be very effectively moved transversely in a direction opposite to its first transverse movement.

FIG. 8 illustrates a method of seeding which is within the invention. Seed and superphosphate are blown through a rubber hose 41 by an air seeder of a type commonly used in the art, downwardly through the tube 36 and its liner 42, and is deflected by the liner 42 at its lower end towards the lowermost point P of the periphery of the tillage disc 25. Since the furrow created by the disc is a shallow acute angled triangle, even if the seed comes to rest without reaching the bottom of the furrow, its depth below the soil surface (regarded by many as being critical) will vary by only a small degree. This compares with a disc seeding device having a vertically disposed disc which will form deep narrow furrows wherein the seed can come to rest on a wall of a furrow at very much less than the required optimum depth.

Consideration of the above embodiment will indicate that the invention has many advantages over the prior art.

Firstly, it will be clear that the invention results in minimal burial of trash (which can otherwise result in consequential temporary depletion of nitrogen and introduction into the soil of soil diseases). Secondly, there is very little loss of top soil which is otherwise displaced transversely by known farming techniques. Thirdly, the width of each cultivated row in the soil is considerable because of the relatively flat angle of the tillage disc 25 and this results in excellent weed killing when the invention is used for cultivating purposes, and tests have indicated that whereas conventional machines require two passes for killing weeds in many instances, an equivalent effect can be achieved with this machine in a single pass.

The use on the tillage disc arm of the stump jump spring 29 avoids bounce of the tillage disc arm 24, and if a further similar spring arrangement is used on the replacing disc arm 26, bounce of the soil replacing disc is also avoided, which could otherwise cause damage when the implement is transported over the rough terrain.

Initial tests have indicated that an implement constructed in accordance with the above embodiment can at least to some extent substitute each of the following commonly used implements:

Plough,
Cultivator,
Trash seeder,
Harrows which are used for clearing trash, and
Rotary harrows.

I claim:

1. A trash farming implement adapted to travel in a given direction, comprising:
   frame means;
   generally horizontally disposed rotatable tillage means supported on said frame means inclined with respect to the ground so that as said tillage means is moved along the ground, the lowermost peripheral portion thereof is in contact with the ground, said lowermost portion being disposed forwardly and to one lateral side of the central region of the tillage means, with respect to said given direction of travel, whereby said tillage means, in operation, displaces soil in a first direction rearwardly and laterally toward said one side of said tillage means;
   generally vertically disposed soil replacement plate means;
   means mounting said soil replacement plate means on said frame means for movement along the ground, said soil replacement plate means being positioned such that the lowermost portion of the periphery thereof is adapted to contact the soil displaced by said tillage means adjacent the periphery of said tillage means at a location on said one side rearwardly of said lowermost peripheral portion of the latter, whereby soil displaced by said tillage means is displaced in said first direction toward said soil replacement means and is redirected by the latter in a direction so as to generally replace the soil in substantially its original position.

2. A trash farming implement according to claim 1 wherein said tillage means comprises a disc whose axis of rotation is inclined to the vertical in end elevation by an angle of between 8° and 28°.

3. A trash farming implement according to claim 1 wherein said tillage means comprises a disc whose axis of rotation is inclined to the vertical in side elevation by an angle of between 5° and 25°.

4. A trash farming implement according to claim 1 wherein each said tillage frame comprises a mounting bracket arranged to be mounted to said main frame and an arm pivoted to the mounting bracket, the arm trailing the mounting bracket and carrying said tillage disc on its lower end, and a stump jump spring between said arm and mounting bracket.

5. A trash farming implement according to claim 1 wherein said tillage means comprises bearings and said bearings surround a hollow tube.

6. A trash farming implement according to claim 5 further comprising a dust cover surrounding said hollow tube.

7. A trash farming implement according to claim 5 further comprising deflector means on the lower end of said hollow tube arranged to deflect seed towards the lowermost point of the periphery of the tillage disc.

8. A trash farming implement according to claim 5 further comprising a seed feed hose secured to the upper end of said hollow tube.

9. A trash farming implement according to claim 5 wherein said soil replacement means comprises a soil replacing disc having a convex side and a concave side, and further comprising a plurality of lugs circumferentially spaced around said convex side.

10. A trash farming implement according to claim 1, wherein said soil replacement plate means comprises a rotatable soil replacement disc.

11. A trash farming implement according to claim 1, wherein said soil replacement plate means has a concave surface for contacting the soil displaced by said tillage means.

12. A trash farming implement adapted to travel in a given direction, comprising:
a frame;
a generally horizontally disposed tillage disc;
means supporting said tillage disc on said frame for rotation about an axis which is inclined to the vertical in end elevation, and which is also inclined to the vertical in side elevation so as to slope generally upwardly and forwardly in the direction of travel,
a generally vertically disposed soil-replacement disc,
means supporting said soil replacement disc on said frame, for rotation about an axis which is inclined to the horizontal in end elevation and which is also inclined with respect to the direction of travel so as to slope generally upwardly and in a direction toward the axis of said tillage disc, said tillage disc and said soil-replacement disc being positioned relative to each other such that the respective lowermost peripheral regions of each are generally adjacent to each other, whereby soil displaced by the tillage disc in one transverse direction is redirected by the soil-replacement disc in the opposite transverse direction.

13. A trash farming implement having a main frame and a plurality of tillage assemblies thereon,
at least one tillage disc on each said tillage frame, bearings operatively disposed between each tillage disc and its tillage frame supporting that disc for rotation about an axis which is inclined to the vertical in end elevation, and which is also inclined to the vertical in side elevation so as to slope upwardly and forwardly in the direction of travel, and
soil replacement means also on that said tillage frame, and so located and oriented that soil displaced by the tillage disc in one transverse direction is redirected by the soil replacement means in the opposite direction, each said soil replacement means comprising a soil replacing disc on a respective said tillage frame, further bearings operatively disposed between the said replacing disc and its tillage frame supporting that disc for rotation about an axis which is inclined to the horizontal in end elevation to slope transversely upwardly in a direction towards said tillage disc on that frame, and which is inclined to the direction of implement travel in plan to define an obtuse angle therewith such that the replacing disc is rearward of the tillage disc, the lowermost points on the peripheries of the discs on each said tillage frame being adjacent each other.

14. A trash farming implement according to claim 13 wherein said inclination of axis of rotation of each said replacing disc slopes transversely at an angle of between 12° and 32°.

15. A trash farming implement according to claim 13 wherein said obtuse angle is between 91° and 135°.

16. A trash farming implement according to claim 13 wherein the lowermost point of the tillage disc periphery is below the lowermost point of the soil replacing disc.

17. A trash farming implement according to claim 13 comprising at least four rows of tillage frames carried by said main frame, each said tillage frame having one said tillage disc and one said soil replacing disc, said discs being so spaced from one another transversely as to form a plurality of equally spaced rows of cultivation.

18. A method of tilling soil comprising moving a plurality of tillage discs of a trash farming implement according to claim 13 over an area of soil, lifting the soil with the tillage discs so as to form furrows beneath respective discs and replacing said soil into said furrows by moving it transversely by said soil replacing discs.

19. A method of tilling and seeding an area of soil with a machine according to claim 13 wherein said tillage disc bearings surround a hollow tube on each respective said tillage frame, and comprising passing seed and fertilizer through said hollow tube, deflecting the seed and fertilizer beneath the tillage disc towards the lowermost point of its periphery, and replacing the soil distributed by the tillage disc by moving it transversely with a said soil replacing disc on that tillage frame.

* * * * *